Patented Nov. 19, 1929

1,735,963

UNITED STATES PATENT OFFICE

HENRY DREYFUS, OF LONDON, ENGLAND

DYEING OF MATERIALS MADE OF OR CONTAINING CELLULOSE DERIVATIVES

No Drawing. Original application filed March 12, 1927, Serial No. 175,012, and in Great Britain December 14, 1926. Divided and this application filed January 30, 1928. Serial No. 250,730.

This invention relates to the dyeing, printing or stenciling of threads, yarns, knitted or woven fabrics or other products made of or containing cellulose acetate or other organic acid esters of cellulose, such for example as cellulose formate, propionate or butyrate, or the product obtained by the treatment of alkalinized cellulose with p-toluene sulphochloride (e. g. the product known as "immunized cotton"), or made of or containing cellulose esters, such as methyl, ethyl or zenzyl cellulose, or the corresponding condensation products of cellulose and glycols or other polyhydric alcohols, all of which cellulose derivatives are hereinafter referred to as organic substitution derivatives of cellulose.

This application is a division of my prior application No. 175,012, filed March 12, 1927.

According to this invention materials made with or containing one or more of the said organic substitution derivatives of cellulose are dyed or otherwise colored with coloring matters or compounds containing one or more thiourethane or substituted thiourethane residues, that is coloring matters or compounds in which an aryl dye nucleus or component thereof is linked directly or indirectly to the nitrogen atom of any ester of sulpho-carbamic acid, or of substituted sulpho-carbamic acids.

Further according to the present invention such coloring matters may be formed on the fibre or material by combination of components, one or more of which contain such thiourethane or substituted thiourethane residues.

The compounds for use according to the present invention may be prepared by any convenient method. Thus for example they may be prepared by heating the corresponding isothiocyanate compounds with alcohols or alkali metal alcoholates or mixtures thereof or with alcoholic caustic alkali, by treating the corresponding thiourea chloride compounds with alcohols or alkali metal alcoholates or mixtures thereof, or by treating a halogen compound containing an aryl dye nucleus or component thereof with an ester of sulpho-carbamic acid. Further in some cases the thiourethane compounds may be prepared by prolonged boiling of an amino compound with an alcohol and carbon bisulphide.

The following examples of coloring matters or compounds for use according to the present invention and of the methods of preparing them are intended to be illustrative and not in any way limitative.

A. Anthraquinone dyestuffs

*Example 1.*—1 - acetylamino - anthraquinone-4-isothiocyanate is heated with ethyl alcohol or with alcoholic potash to obtain the dyestuff

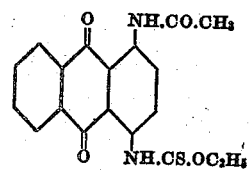

B. Azo dyestuffs

*Example 2.*—Benzene-azo-α-naphthylamine is diazotized and coupled with the product obtained by boiling salicylic acid-5-thiocyanate with alcoholic potash to obtain a dyestuff of the formula

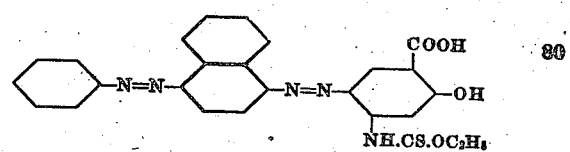

Azo dyestuffs may be produced on the fibre or material in a similar manner by the coupling of components (base or aminoazo compound and developer) one or more of which contains thiourethane residues.

The dyestuffs or compounds may be applied in aqueous solution (where they are sufficiently soluble) and I prefer to employ this method when possible. The dyestuffs or compounds may be made more soluble by the introduction of side chains containing one, two, three or more hydroxy groups for example side chains of the type described in U. S. applications S. No. 162,936 and S. No. 162,937.

When, however, the dyestuffs or compounds are not sufficiently soluble they may be applied to the goods in aqueous suspension or in colloidal solutions or dispersions obtained by grinding (for example in colloid mills), by dissolving in a solvent and pouring into water containing or not containing protective colloids, by pretreating the coloring matters or compounds with solubilizing agents or by other methods. Of the solubilizing agents which are suitable for obtaining such dispersions I may mention those described in U. S. Patents Nos. 1,618,413 and 1,618,414 and U. S. application S. No. 50,525, and in British Patents Nos. 273,819 and 273,820 and the corresponding U. S. applications S. Nos. 134,138 and 176,289; viz bodies of oily or fatty characteristics namely higher fatty acids or sulphonated or other derivatives thereof containing salt forming groups, such as sulphoricinoleic acid or other sulphonated fatty acids or salts of such acids or bodies, for instance their alkali or ammonium salts, used alone or in conjunction with auxiliary solvents as described in U. S. applications S. No. 48,666 and S. No. 152,517; carbocylic compounds containing in their structure one or more salt forming groups or salts of such compounds; sulpho-aromatic fatty acids or salts thereof; and soluble resin soaps or sodium or other soluble salts or other soluble salts of resin acids.

Though coloring matters and compounds belonging to particular groups have been described above, it is to be understood that the invention is not limited to coloring matters or compounds of these groups, but comprises broadly the application to materials made of or containing cellulose acetate or other of the herein described organic substitution derivatives of cellulose of coloring matters or compounds in which an aryl dye nucleus or component thereof is linked either directly or indirectly to one or more thiourethane or substituted thiourethane residues. In the case of using components of aryl dye nuclei the actual coloring matters may be produced on the fibre or material.

Mixed goods containing for example, in addition to the organic substitution derivative or derivatives of cellulose, cotton, silk, wool, or the cellulose type of artificial silk or other fibres or threads, may be dyed or otherwise colored with or without employment of other dyestuffs or components according to the character of the threads or fibres used in association, said other dyestuffs or components being applied if desired before or after the application of the coloring matters or compounds of the present invention, or when not deleteriously affected thereby, they may be applied in conjunction therewith.

The term dyeing in the claims is to be understood to include printing and stenciling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one thiourethane residue.

2. Process according to claim 1, characterized in that the coloring compound is applied in aqueous solution.

3. Process according to claim 1, characterized in that the coloring compound is applied in aqueous colloidal solution.

4. Process according to claim 1, characterized in that the coloring compound is applied in aqueous colloidal solution obtained by pretreating the compound with a solubilizing agent.

5. Process for dyeing material comprising an organic substitution derivative of cellulose, comprising dyeing the material with a coloring compound which comprises at least one substituted thiourethane residue.

6. Process for dyeing material comprising an organic substitution derivative of cellulose, comprising dyeing the material with an azo coloring compound which comprises at least one thiourethane residue.

7. Process for dyeing material comprising cellulose acetate, comprising dyeing the material with a coloring compound which comprises at least one thiourethane residue.

8. Process according to claim 7, characterized in that the coloring compound is applied in aqueous solution.

9. Process according to claim 7, characterized in that the coloring compound is applied in aqueous colloidal solution.

10. Process according to claim 7, characterized in that the coloring compound is applied in aqueous colloidal solution obtained by pretreating the compound with a solubilizing agent.

11. Process for dyeing material comprising cellulose acetate, comprising dyeing the material with a coloring compound which comprises at least one substituted thiourethane residue.

12. Process for dyeing material comprising cellulose acetate, comprising dyeing the material with an azo coloring compound which comprises at least one thiourethane residue.

13. Material comprising an organic substitution derivative of cellulose, dyed with a coloring compound which comprises at least one thiourethane residue.

14. Material comprising cellulose acetate, dyed with a coloring compound which comprises at least one thiourethane residue.

In testimony whereof I have hereunto subscribed my name.

HENRY DREYFUS.